United States Patent [19]

Sachs et al.

[11] Patent Number: 4,828,599
[45] Date of Patent: May 9, 1989

[54] METHOD FOR PRODUCING GLASS TUBING OF A NARROWED DIAMETER

[75] Inventors: Frederick Sachs, Buffalo; Victor Demjanenko, North Tonawanda, both of N.Y.

[73] Assignee: The Research Foundation of State University of New York, Albany, N.Y.

[21] Appl. No.: 229,905

[22] Filed: Aug. 8, 1988

Related U.S. Application Data

[60] Division of Ser. No. 863,119, May 14, 1986, which is a continuation-in-part of Ser. No. 693,725, Jan. 23, 1985, abandoned.

[51] Int. Cl.⁴ ............................................. C03B 23/11
[52] U.S. Cl. ........................................ 65/109; 65/110; 65/271; 65/283
[58] Field of Search .................. 65/109, 110, 271, 272, 65/279, 280, 283

[56] References Cited

U.S. PATENT DOCUMENTS

| | | |
|---|---|---|
| 3,091,105 | 5/1963 | Morrill .............................. 65/110 X |
| 3,249,414 | 5/1966 | Hamilto ............................. 65/110 X |
| 3,427,143 | 2/1969 | Deery et al. ....................... 65/110 X |
| 3,907,536 | 9/1975 | Achener ............................ 65/110 X |
| 4,010,022 | 3/1977 | Schul ................................ 65/110 X |

*Primary Examiner*—Arthur Kellogg
*Attorney, Agent, or Firm*—Robert P. Simpson; Michael L. Dunn

[57] ABSTRACT

The method of the present invention consists of the steps of heating an area along the length of a small diameter glass tube while the tube is being rotated, pulling the heated tube using an unidirectional force to rapidly extend the heated area while mechanically maintaining the heat source centrally located along the portion of the tubing being extended. The extended tubing is subsequently cooled and separated at the narrowed portion to produce two capillary tubes.

6 Claims, 1 Drawing Sheet

METHOD FOR PRODUCING GLASS TUBING OF A NARROWED DIAMETER

This invention was made with United States Government support under NS-13194 awarded by the National Institute of Health. The Government has certain rights in this invention.

This is a divisional of application Ser. No. 863,119, filed May 14, 1986, which in turn is a continuation-in-part of U.S. Ser. No. 693,725, filed Jan. 23, 1985 (now abandoned).

BACKGROUND OF THE INVENTION

The present invention relates to a method and an apparatus for the production of glass tubing having a narrowed diameter, and more in particular, glass microcapillaries. Microcapillaries when filled with an electrolyte have utility as microelectrodes or as patch clamp electrodes useful in electrophysiology and in the study of cell biology. More particularly, the present invention relates to microcapillary tubes having ultrafine tips with relatively short tapers.

In the study of membrane phenomena, particularly of nerve and muscle cells, valuable information may be obtained by measuring the potential difference across the cell membrane. The potential is typically measured by a high-impedance voltmeter, one terminal of which is placed in contact with extracellular solution, while the other terminal is placed in contact with the intracellular fluid. In order to make connection with the intercellular fluid it is necessary to penetrate the cell membrane to insert the electrode. The penetration must be accomplished without causing serious injury to the cell, or disrupting the cell structure or function. Electrodes formed of finely drawn-out glass tubes having an outside diameter of one micron or less filled with an electrolyte, such as an aqueous solution of salts of sodium or potassium, have been found to be aptly suited to use. However, as noted below, such electrodes have hitherto been restricted in use because of tube diameter. Such electrodes are sometimes referred to as micropipettes or ultra microelectrodes as the size of the electrode tip is past the resolving power of an ordinary light microscope.

The study of cellular response, especially in the field of neurophysiology, has heretofore been confined to the study of large cells because of the difficulties in penentrating small cells and maintaining normal activity after entry. Such limitation is particularly severe in the vertebrate brain, spinal cord, and retina where the vast majority of cells are smaller than about 20 microns in diameter. Usually cells show no noticeable injury when they are impaled with a microelectrode having a tip diameter of 0.5 micron or less. Such ultrafine electrodes have heretofore been produced, but only with utmost difficulty.

Microcapillaries may be manually produced by heating a small diameter glass tube until the glass becomes plastic and quickly drawing the tubing apart. However, this process requires considerable skill and more than an equal amount of patience. Even with those criteria the product produced manually varies widely in size and shape and the percentage of usable product is extremely low.

Various apparatus have been suggested to pull heated, small diameter, or capillary glass tubing to produce miocrocapillaries. For example, the following journal articles describe a number of such approaches: Rev. of Sci. Int., Vol. 24, No. 7, 1953, pp. 528–531 and Vol. 39, No. 2, 1968, pp. 158–60; J. Sci. Inst., 2, 1969, pp. 1087–1090; Neuroscience, 2, 1977, pp. 813–827; and J. Neuro. Methods, 7, 1983, pp. 171–183. Although the apparatus described produce a more consistent product than manual production, the product produced typically has an undesired taper or an outside diameter too large for small cells, i.e. greater than 0.5 micron. The taper, or bevel of a microcapillary tube is important as not only does the tip of the tube penetrate the cell but necessarily a portion of the tube length also enters the cell. Thus, a microcapillary with a sharp taper defeats the purpose of the narrow outside diameter at the tip. Conversely, a prolonged taper yields a microcapillary tube too fragile for normal use. Useful tips generally taper, as measured from the tube tip to the untapered portion of the tube, at least about twice the diameter of the starting tube.

Although the present invention is particularly adapted to the consistent production of microcapillary tubes having fine tips, those having outside diameters in there range between about 0.1 and 0.5 microns, microcapillary tubes of other useful configurations and sizes may be produced. For example, microcapillary tubes having tips ranging in size from about 0.5 to 1.5 micron outside diameter may consistently be produced. Such tubes are useful in extracellular patch recording electrodes. The taper angle in such tubes is usually steep to lower the series resistance and to facilitate the release of air bubbles. the dielectric loss and hence the noise of the recording is in part related to the thickness of the tube wall. The present invention provides a means of lowering capacitance and loss by controlling the forming conditions to produce a thicker tube wall. Microcapillary tubes having larger tips, between about 5 and 30 microns are useful in extracellular stimulating techniques, for suction pipettes, for injecting DNA or RNA into oocytes and for local fluid perfusion pipettes. Such microcapillary tubes of consistent shape and size are aptly produced by the present invention.

BRIEF DESCRIPTION OF THE INVENTION

The present invention provides a means of controlling conditions and forces acting on a section of glass tubing, e.g., the pulling, or drawing, force, the time, the temperatue and the distance pulled to produce a capillary tube having an outside diameter of 5 microns or less, and more preferbly a microcapillary tube having an outside diameter of 0.5 micron or less at the tip. The microcapillaries of the present invention have a relatively constant outside diameter at least along about the first 25 microns of the tube as measured from the tip.

The method of the present invention consists of the steps of heating an area along the length of a small diameter glass tube while the tube is being rotated, pulling the heated tube using an unidirectional force to rapidly extend the heated area while mechanically maintaining the heat source centrally located along the portion of the tubing being extending. The extended tubing is subsequently cooled and separated at the narrowed portion to produce two capillary tubes.

The apparatus of the present invention consists of two independently rotatable, co-axially aligned chucks, each chuck independently rotatable by a separate, independent drive means. The chucks rotate in an essentially simultaneous manner, that is, the speed of rotation of each chuck is essentially the same. Each of the chucks has an adjustable collet thereon adpated to receive and hold a section of glass tubing aligned therebetween. A means of moving one of said chucks away from the other is provided. A moveable heating means is positioned intermediate the chucks. The moveable heating means is adapted to start at the same time and to move in the same direction as the moveable chuck, but half the distance that the chuck moves. The moveable heating means provides longitudinal symmetry while the rotational means provides axial symmetry.

The present apparatus and method are easily adapted to be programmed and controlled by a computer to precisely control the forming conditions, i.e., pulling force, temperature, time and distance pulled, to facilitate a consistent reproduction of capillary tubes of various outside diameters and tapers. Although the present invention is particularly adapted to the production of microcapillary tubes or microelectrode tubes having a stepped taper, capillary tubes, having wider diameter tips, adapted to sampling and patching are also consistently produced.

The present invention also is adapted to produce capillary tubes having one or more twists along their length. Such twisted tubes are produced by varying the speed of one of the chucks while the heated tube is being extended.

Microcapillary tubes having divisions, or septum, may be produced from divided capillary tubes by extending them in the same manner as a single channel tube.

DETAILED DESCRIPTION AND PREFERRED EMBODIMENT OF THE INVENTION

The present invention will now be described in reference to the accompanying drawings in which similar components are shown by corresponding numbers in each of the views.

Figure 1:
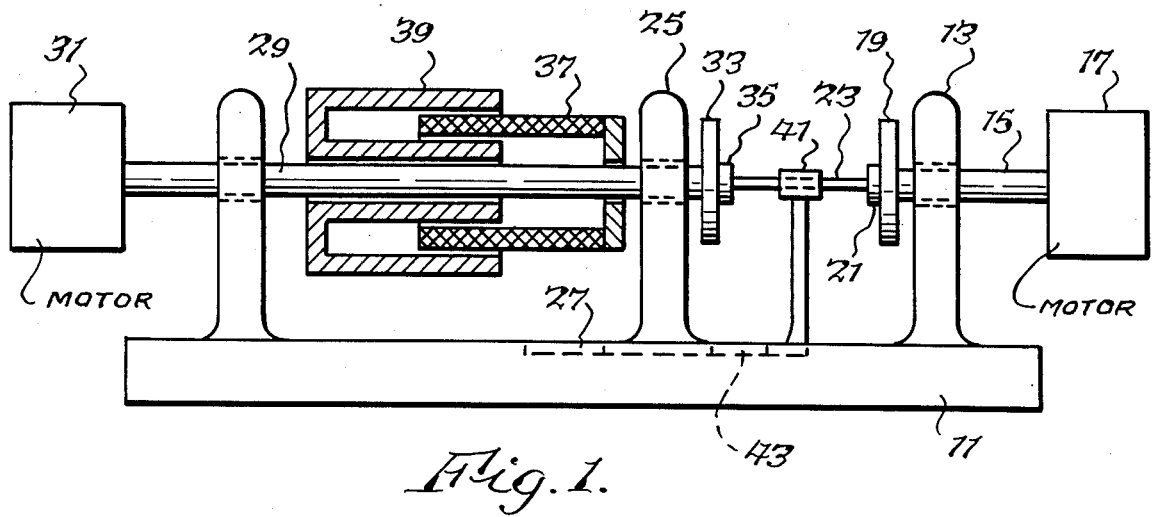
FIG. 1 is a front elevation of the present glass tube drawing apparatus showing the apparatus in position at the start of a portion of glass tubing.

Looking now at FIG. 1, the drawing apparatus is arranged on a suitable frame such as 11. Frame 11 has stationary headstock 13 mounted thereon. Headstock 13 is suitably journaled to receive shaft 15. Shaft 15 is independently rotated by a variable speed motor, such as, 17, and has tube chuck 19 mounted thereon. Tube chuck 19 has adjustable collet 21 adapted to receive and hold one end of a section of glass tubing, such as 23.

Frame 11 has moveable tailstock 25 mounted thereon. Tailstock 25 is adapted to move in a direction away from headstock 13, suitably along tracks 27. Tailstock 25 is journaled to receive shaft 29. Shaft 29 is independently rotated by a variable speed motor, such as 31, and has tube chuck 33 mounted thereon. Chuck 33 has adjustable collet 35 adapted to align with collet 21 and to receive and hold the other end of glass tubing 23.

Tailstock 25 is moved away from headstock 13 by known means such as air pressure or vacuum. In a preferred embodiment the moving means, as shown in the drawings, is electromagnetic. Suitably moveable coil 37 is mounted on shaft 29 and is adapted to fit within stationary magnet 39. Upon activation of coil 37, tailstock 25 is moved rapidly away from headstock 13. The force that tailstock 25 is moved may be varied by varying the number of turns on the current in coil 37 or by dampening coil 37 by means of a spring or plunger arrangement which are well known in the art.

A heating means, such as, 41 is provided intermediate, and preferably centered between independently rotatable chucks 19 and 33. Heating means 41 is moveable in a direction away from chuck 19 suitably along track 43. While various heating means may be used, for example various flames, it is preferred to utilize an electrical means, such as a platinum coil or loop which surrounds glass tube 23. Heating means 41 is adapted to move simultaneously with, and in the same direction as, tailstock 25. However, the distance heating means 41 moves is about one-half the distance that tailstock 25 moves. The movement being coordinated to maintain the heating means centrally positioned on the central position of the glass tubing being separated. Suitably the heating means 41 is connected to tailstock through a geared linkage, such as, 43 enabling heating means 41 to move as tailstock 25 is moved, but a lesser distance.

Figure 2:
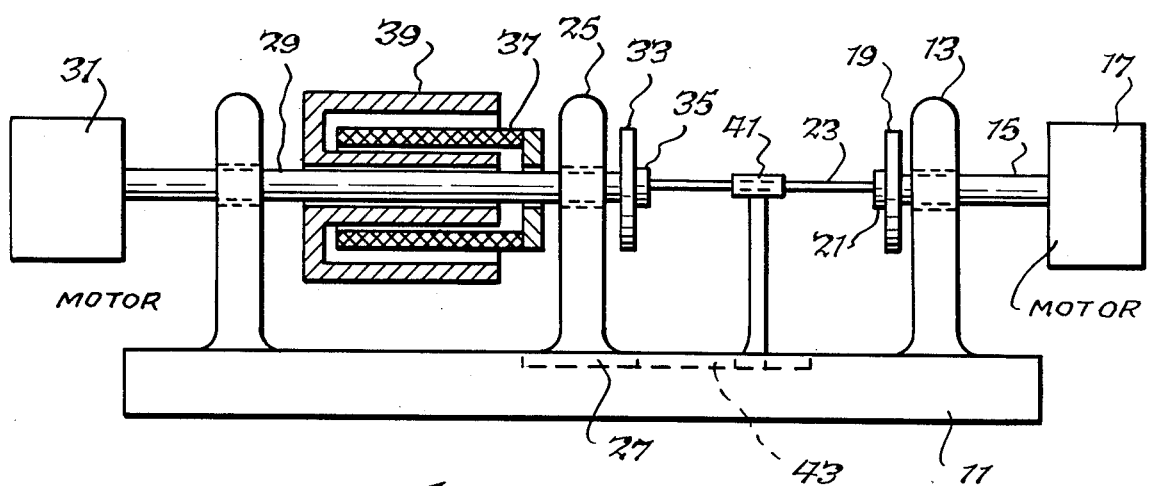
FIG. 2 is also a front elevation similar to FIG. 1 except the apparatus is shown at the end of the draw.

FIG. 2 shows the device of FIG. 1 after movement of tailstock 25 and the drawing of tube 23 to form two microcapillaries which are obtained by separating expanded tube 23 near its center and removing the expanded portions from the chuck collets.

In use the glass tubing to be drawn is placed in the collets and rotated. A heating means is then centered on the tubing. Heat is then applied until the area of the tubing being heated becomes plastic. This may be sensed by instrumentation adapted to exert a slight pull on the tubing length and respond to a release, or partial release of such pull. The tubing is expanded the desired distance by adjusting the length of movement of the tailstock. The force at which the tubing is extended may be varied by varying the force at which the extension means acts, for example, in an electromagnetic embodiment, the size and strength of the coil or the size and strength of the magnet may be varied. The extension time may also be varied by adjusting the extension means, suitably by dampening. Generally the heating time and intensity are adjusted to heat an area on the rotating glass tubing to a plastic state, extending the tube while maintaining the heat centrally located within the heated area. At the end of the draw the heat is turned off and then extended tubing regains its rigidity. If desired, the process may be repeated starting with the previously expanded glass tubing.

It will be understood that the foregoing examples are illustrative of the invention and should not be considered as limiting and that other embodiments of the invention are possible without departing from the invention's spirit and scope.

What is claimed is:

1. A method of producing a narrowed diameter glass tube comprising the steps of:
   a. heating while rotating a section of glass tubing using a heat source until a heated area of said tubing becomes plastic;
   b. extending said tubing in one direction to rapidly extend said heated area;
   c. mechanically maintaining said heat source centralized along the tubing portion being extended;
   d. cooling said extended tubing; and
   e. separating said extended tubing along a central portion to form two sections of glass tubing having narrowed diameters.

2. The method of claim 1 wherein the narrowed diameter glass tube is a microcapillary tube.

3. The method of claim 1 wherein the heat source is electrical.

4. The method of claim 1 wherein the heat source comprises a platinum coil.

5. The method of claim 1 wherein the heated tubing is twisted while being extended.

6. The method of claim 1 wherein the process steps a. through d. are repeated prior to step e.

* * * * *